(12) United States Patent
Hawit

(10) Patent No.: US 8,442,429 B2
(45) Date of Patent: May 14, 2013

(54) SYSTEM FOR PROVIDING AUDIO MESSAGES ON A MOBILE DEVICE

(76) Inventor: Andre F. Hawit, Foster City, CA (US)

( * ) Notice: Subject to any disclaimer, the term of this patent is extended or adjusted under 35 U.S.C. 154(b) by 271 days.

(21) Appl. No.: 12/755,281

(22) Filed: Apr. 6, 2010

(65) Prior Publication Data

US 2011/0246201 A1 Oct. 6, 2011

(51) Int. Cl.
*H04H 7/00* (2006.01)
(52) U.S. Cl.
USPC .............. 455/3.06; 455/412.1; 455/412.2; 455/414.1; 704/260; 704/E13.001
(58) Field of Classification Search .......... 455/0.06, 455/412.2, 414.3, 231, 3.06, 412.1, 414.1, 455/414.4, 423, 63, 450, 456, 67.1; 704/260, 704/E13.001, 14; 709/231; 701/118; 705/7.39
See application file for complete search history.

(56) References Cited

U.S. PATENT DOCUMENTS

| | | | |
|---|---|---|---|
| 6,236,855 B1* | 5/2001 | Austin | 455/423 |
| 7,684,343 B2* | 3/2010 | Vasil'evich et al. | 370/252 |
| 2002/0049852 A1* | 4/2002 | Lee et al. | 709/231 |
| 2002/0062393 A1 | 5/2002 | Borger | |
| 2002/0095330 A1 | 7/2002 | Berkowitz | |
| 2003/0162549 A1* | 8/2003 | Carlsson | 455/456 |
| 2005/0080665 A1 | 4/2005 | Bowman-Amuah | |
| 2005/0108095 A1 | 5/2005 | Perlmutter | |
| 2006/0248209 A1 | 11/2006 | Chiu | |
| 2007/0078709 A1 | 4/2007 | Rajaram | |
| 2007/0162296 A1 | 7/2007 | Altberg | |
| 2008/0201361 A1 | 8/2008 | Castro | |
| 2009/0222344 A1* | 9/2009 | Greene et al. | 705/14 |
| 2009/0222345 A1* | 9/2009 | Greene | 705/14 |
| 2011/0261934 A1* | 10/2011 | O'Neill | 379/88.12 |

FOREIGN PATENT DOCUMENTS

| | | |
|---|---|---|
| EP | 1043905 | 10/2000 |
| WO | WO2008/050196 | 5/2008 |

OTHER PUBLICATIONS

PCT International Search Report dated Jul. 29, 2011, PCT Patent Appl. No. PCT/US2011/031263.
PCT Written Opinion of the International Searching Authority dated Jul. 29, 2011, PCT Patent Appl. No. PCT/US2011/031263.
Oshiro, "Google Voice to add Audio Ads?" Read Write Web, www.readwriteweb.com, Jul. 16, 2009.

(Continued)

*Primary Examiner* — Tan Trinh
(74) *Attorney, Agent, or Firm* — Vierra Magen Marcus LLP

(57) ABSTRACT

While performing a function, a mobile device identifies that it is idle while it is downloading content or performing another task. During that idle time, it gathers one or more parameters (e.g., location, time, gender of user, age of user, etc.) and sends a request for an audio message (e.g., audio advertisement). One or more servers at a remote facility receive the request with the one or more parameters, and use the parameters to identify a targeted message. In some cases, the targeted message will include one or more dynamic variables (e.g., distance to store, time to event, etc.) that will be replaced based on the parameters received from the mobile device, so that the audio message is dynamically updated and customized for the mobile device. In one embodiment, the targeted message is transmitted to the mobile device as text. After being received at the mobile device, the text is optionally displayed and converted to an audio format and played for the user.

9 Claims, 10 Drawing Sheets

OTHER PUBLICATIONS

Kincaid, "Pandora Radio Starts Serving Audio Ads," TechCrunch, http://techcrunch.com/2009/01/20/pandora-radio-starts-serving-audio-ads/, Jan. 20, 2009.

Slawski, "Targeted Audio Advertising with Google, Part 1—Examples," www.seobythesea.com, Apr. 14, 2007.

* cited by examiner

Figure 4

| Column Name |
| --- |
| Ad_Id |
| Campaign_Id |
| Price |
| Bid_Price |
| Def_Priority |
| Msg_Type |
| Msg_Txt |
| Msg_Bin |
| Loc_x |
| Loc_y |
| Loc_R |
| Loc_City_Code |
| Loc_State_Code |
| Loc_Country_Code |
| Travel_Dist |
| Time_Period |
| Age_Group |
| Gender |
| Marital_Status |
| Ed_Level |
| Ed_Type |
| App_Group |
| App_List |
| Device_Group |
| Job_Group |
| HHI_Group |
| Ethnicity |
| Religion |
| Interest |

Figure 5

| Column Name |
| --- |
| Ad_Id |
| Campaign_Id |
| Cat |
| Priority |
| Price |
| Bid_Flg |
| Msg_Type |
| Msg_Txt |
| Msg_Bin |
| Loc_x |
| Loc_y |
| Loc_R |
| Loc_City_Code |
| Loc_State_Code |
| Loc_Country_Code |
| Travel_Dist |
| Time_Period |
| Age_Group |
| Gender |
| Marital_Status |
| Ed_Level |
| Ed_Type |
| App_Group |
| App_List |
| Device_Group |
| Job_Group |
| HHI_Group |
| Ethnicity |
| Religion |
| Interest |
| Equiv_Ad1 |
| Equiv_Ad2 |
| Equiv_Ad3 |
| Equiv_Ad4 |

SYSTEM FOR PROVIDING AUDIO MESSAGES ON A MOBILE DEVICE

BACKGROUND

Mobile computing devices are becoming more popular. For example, many people use smart phones (e.g., iPhone, Android, Blackberry, etc.), tablets, iPod, laptops and other mobile computing devices. These devices provide new opportunities for advertisers to reach potential customers.

In the past, advertisers used traditional media (such as television, radio, newspapers and magazines) to expose potential customers to advertisements. However, people are spending less time with traditional media and more time with mobile computing devices.

One form of advertising on mobile computing devices is to serve advertisements on web pages. However, that requires a user to access the World Wide Web.

BRIEF DESCRIPTION OF THE DRAWINGS

FIG. 4 depicts the format of a data structure in the database.

FIG. 5 depicts the format of a data structure in RAM (Cache).

DETAILED DESCRIPTION

A system is proposed that can play audio messages on mobile devices. Various embodiments are disclosed. In one embodiment, an audio message is presented to a user when the mobile device is idle. An example of idle time is when the mobile device requests info from a remote device and is waiting for response. In some embodiments, messages are delivered to the mobile device as text and converted to an audio format on the mobile device. In some embodiments, a portion of a message is replaced dynamically based on one or more parameters associated with the mobile device such that the user of the mobile device receives a personalized (targeted) message.

Many different types of audio messages can be presented using the mobile computing devices. In one embodiment, the audio messages are short voice advertisements that are presented to the user of a mobile computing device. These advertisements can be two to five seconds in length and be used to fill idle time while applications are loading, waiting, processing, or performing other tasks. In one set of implementations, the short voice advertisements are funny and entertaining. The advertisements can be targeted using optional parameters provided by application on the mobile computing device, or the advertisements can be provided in a random basis. Advertisers will be able to submit their voice advertisements as text files, which will be converted to voice at the mobile computing device, or converted to voice at a central server. Additionally, advertisements may have a dynamic portion (built on the fly) based on provided parameters in the request.

The voice advertisements are short in duration and being played during idle time. When a mobile device determines that it has idle time, it will request an advertisement and that advertisement will be served up in a very short manner, typically within one second (in some embodiments less than two to three seconds). In other embodiments, other types of audio messages can be provided, including public service announcements, local weather forecast, news headlines, etc.

Figure 1:
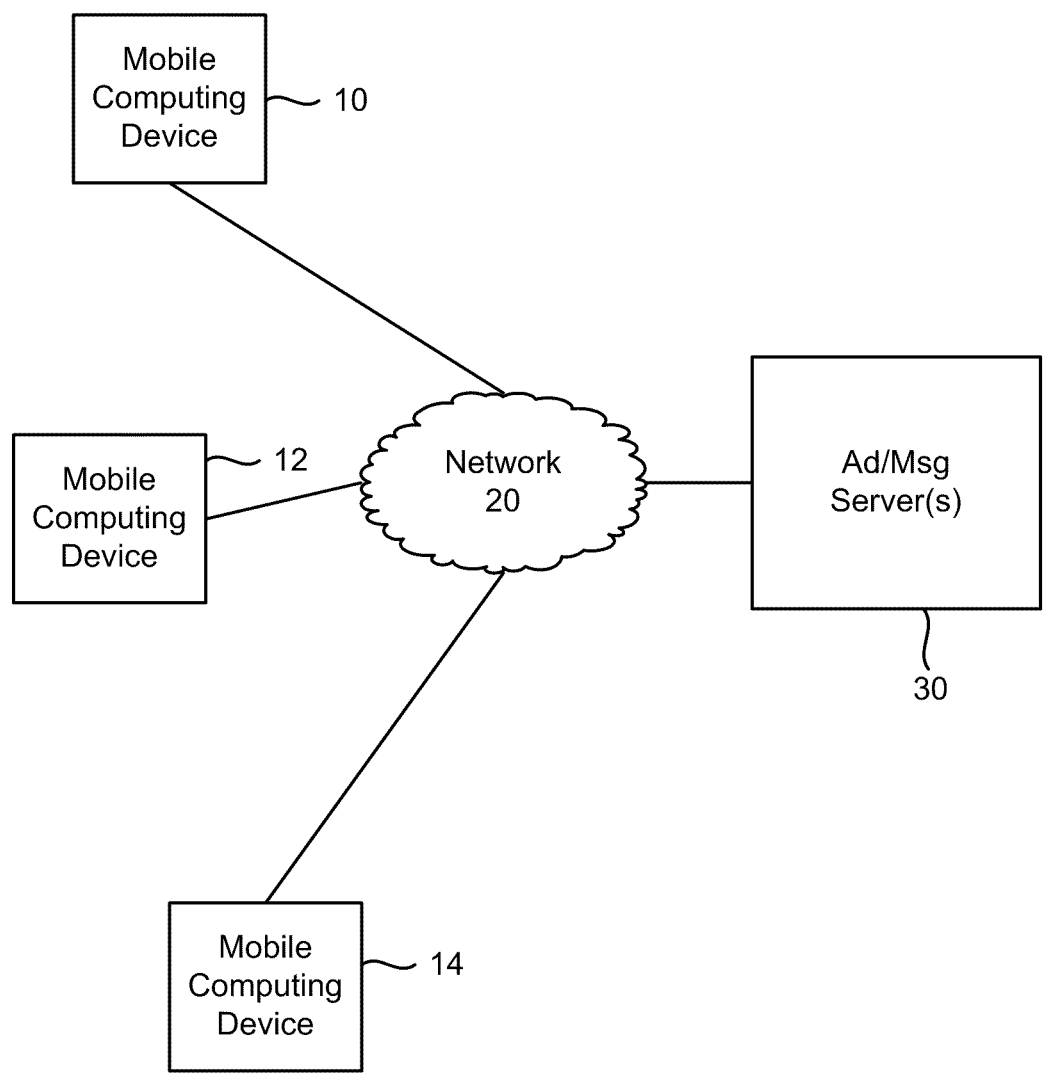
FIG. 1 is a block diagram of one embodiment of a system that can play audio messages on mobile devices.

FIG. 1 is a block diagram describing a system for presenting audio messages (e.g., advertisements) to one or more mobile computing devices. FIG. 1 shows three mobile devices, 10, 12 and 14, communicating with one or more Ad/Msg servers 30 via network 20. Network 20 can be the Internet, a private LAN, WAN, WiFi, cellular telephone network, landline telephone network, other communication system, or a combination of the above-listed communication means. No one particular communication system is required.

Although FIG. 1 shows three mobile devices (10, 12 and 14), more or less than three mobile computing devices can be used. It is contemplated that the system will work with tens of millions of mobile computing devices. In one example implementation, the mobile computing devices are cellular telephones. For example, the mobile computing devices can be smart phones such as the Apple iPhone, Android or Blackberry from RIM. Other cellular phones can also be used. The mobile computing devices (10, 12, 14) can also be tablets, music devices (like iPods), laptops, computing devices in automobiles, etc. No one particular type of mobile computing device is required. Ad/Msg servers 30 can include one or more servers that store audio messages and transmit audio messages to mobile computing devices 10, 12, 14 in response to a request for an audio message.

Figure 2A:
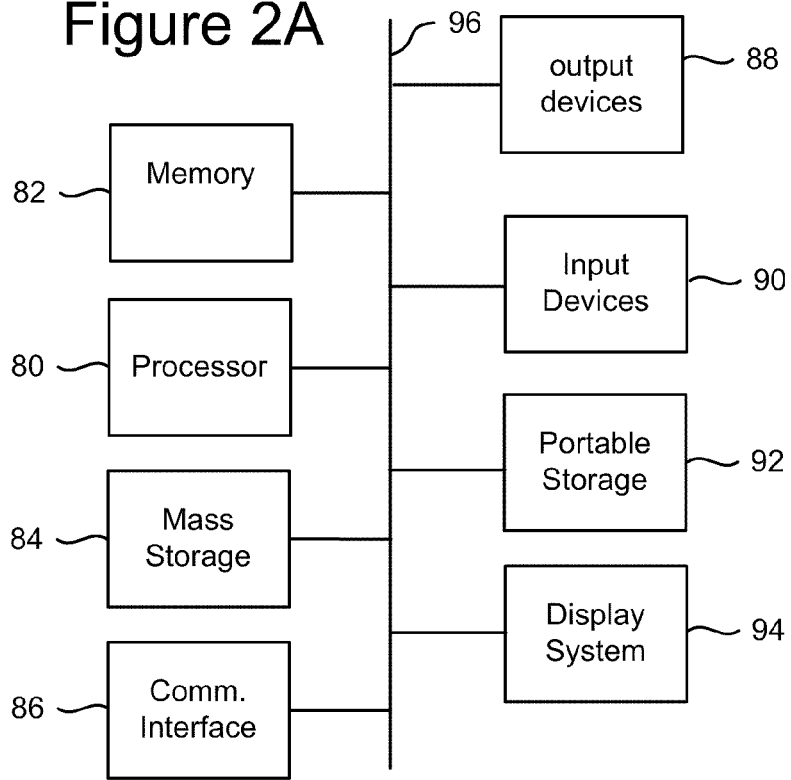
FIGS. 2A and 2B are block diagrams of computing devices.

FIG. 2A is a high level block diagram of a computing system which can be used to implement any of the computing devices of FIG. 1. In one embodiment, the computing system of FIG. 2A is used to implement Ad/Msg servers 30. The computing system of FIG. 2A includes processor 80, memory 82, mass storage device 84, communication interface 86, output devices 88, input devices 90, portable storage 92, and display system 94. For purposes of simplicity, the components shown in FIG. 2A are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that is loaded into memory 82 to program processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 2A. In one embodiment, system software for implementing the present invention is stored on such a portable medium, and is input to the computer system via portable storage medium drive 92.

Communication 86 may include any type of input/output interface used for communication with the computer system. For example, communication interface 86 may include one or more network interfaces (e.g., Ethernet Card) for connecting the computer system to one or more networks, a modem, a router, a wireless communication device, etc. In some embodiments, the communication interface will also include software for facilitating the communication.

Input devices 90 provide a portion of a user interface, and may include a keyboard or pointing device (e.g., mouse, track ball, etc.). In order to display textual and graphical information, the computing system of FIG. 2A will (optionally) have an output display system 94, which may include a video card and monitor, and/or an interface to a television/projector/stereo/switching device in conjunction with or separate from the television/projector/stereo/switching device. Output devices 88 can include speakers, printers, monitors, etc.

The components depicted in the computing system of FIG. 2A are those typically found in computing systems suitable for use with the technology described herein, and are intended to represent a broad category of such computer components that are well known in the art. Many different bus configurations, network platforms, operating systems can be used. The technology described herein is not limited to any particular computing system.

Figure 2B:
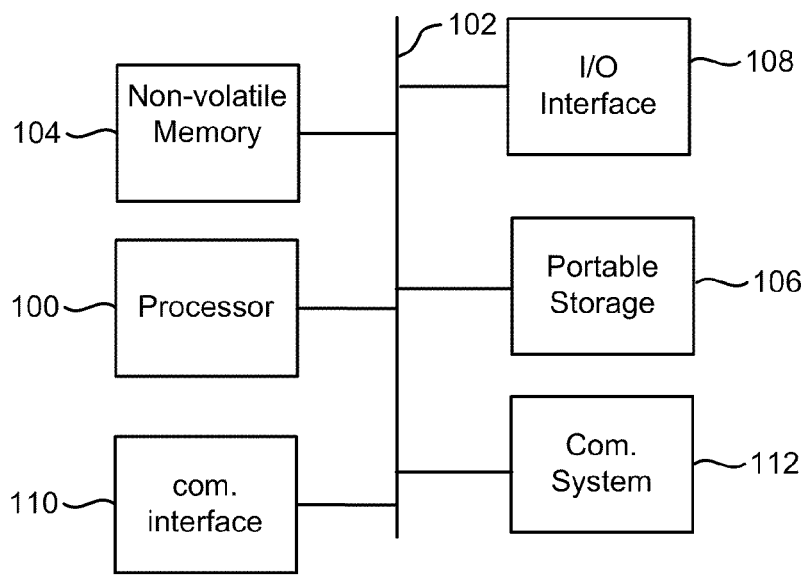

FIG. 2B is a high level block diagram of a computing system which can be used to implement any of the computing devices of FIG. 1. In one embodiment, the computing system of FIG. 2B is used to implement a mobile computing device, such as mobile computing devices 10, 12 or 14.

The computing device of FIG. 2B includes processor 100 communicating on bus 102 to nonvolatile memory 104, portable storage 106, IO interfaces 108, communication interface 110 and communication system 112. For the purposes of simplicity, the components shown in FIG. 2B are depicted as being connected via a single bus 102. However, the components may be connected via local processor bus, with the remaining devices connected to one or more input/output buses.

Processor 100 may contain a single microprocessor or may contain a plurality of microprocessors by configuring the computer system as a multi-processor system. In one embodiment, one processor is the main processor and another processor can be a digital signal processor or math co-processor.

Nonvolatile memory 104 stores instructions and data for programming a processor 100 to implement the technology described herein. In one embodiment, nonvolatile memory 104 may include banks of flash memory or other types of nonvolatile storage. Portable storage 106 can include a flash memory card (e.g. compact flash, SD, micro SD, etc.) or a small disk drive. IO interface 108 can include a screen (e.g. a touch screen or regular output-only screen), a keyboard, speaker, and headphone jack.

Communication interface 110 includes circuits that provide for communication via WIFI or other wireless technology. Alternatively, communication interface 110 can include a standard network card for communicating on an Ethernet network.

Communication system 112 is a standard cellular telephone communication system for transmitting and cellular telephone calls. Additionally, communication system 112 can be used for transmitting data over a cellular network and receiving data over a cellular network, as known in the art.

The components depicted in the computing system of FIG. 2B are those typically found in computing systems suitable for use with the technology described herein, and are intended to represent a broad category of such computer components that are well known in the art. Many different bus configurations, network platforms, operating systems can be used. The technology described herein is not limited to any particular computing system.

Figure 3:
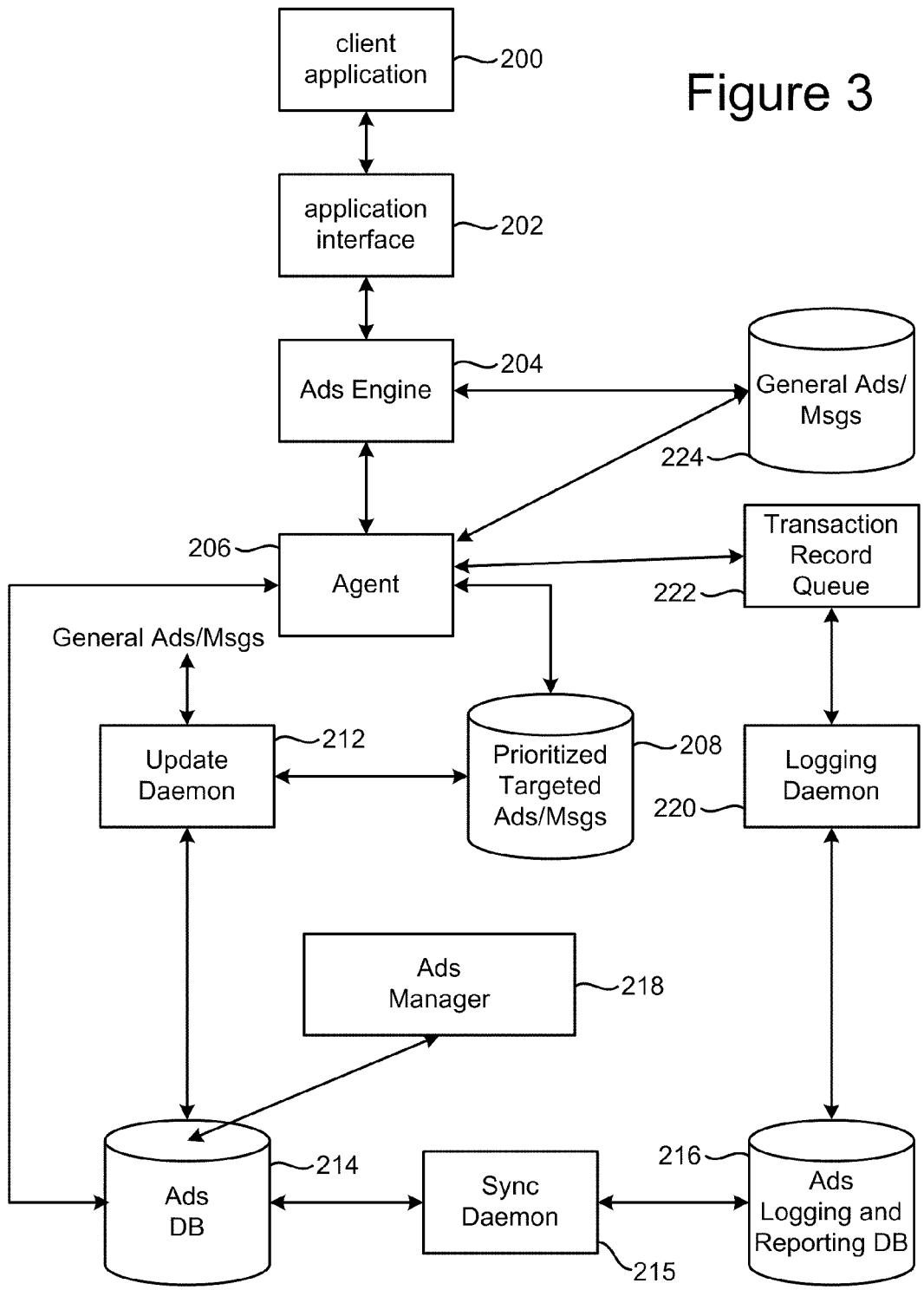
FIG. 3 is a block diagram depicting various software entities that implement the processes for playing audio messages on mobile devices.

FIG. 3 is a block diagram depicting various software entities that implement the process for providing audio messages on mobile devices. FIG. 3 shows a client application 200, which resides on mobile computing devices 10, 12, 14. Client application 200 communicates with mobile interface 202 via network 20. Application interface 202 resides on one of the ad/msg servers 30. Application interface 202 is used to communicate with client application 200. Data to be transmitted from application interface 202 to client 200 is received by application interface 202 from Ads Engine 204. Data received from client application 200 by application interface 202 is provided to Ads Engine 204. Client application 200 can be any software application installed and running on a mobile computing device that is configured to utilize the service described herein using a software library that is provided and/or following given standards. In one embodiment, application 200 is a voice capable software client that performs various search and productivity functions in response to voice commands.

Ads Engine 204 controls the process of sending advertisements (or other types of messages) to client application 200. When client application 200 sends a request to Ads Engine 204 (via application interface 202), Ads Engine 204 masks the received Ad request parameters (removing the parameters that are not available in any of the Ads ready to be served in Cache, in order to optimize performance) and then creates a new instance of an Agent 206 (or utilize an existing instance of Agent 206) to find the appropriate advertisement to return to client application 200. Agent 206 is a multi-threaded process. Agent 206 will retrieve prioritized targeted advertisements and high priority messages from prioritized targeted ads/messages data store 208. Alternatively, if Agent 206 cannot identify a matching targeted advertisement (or other type of message), then Agent 206 can send a general advertisement (or other type of message) from general ad/message data store 224. When Agent 206 returns a particular advertisement (or other type of message) Ads Engine 204, Agent 206 will create a record in transaction record queue 222 of which advertisement (or other type of message) is being served to which client application at the specific time. Logging daemon 220 will update the Ads Logging and Reporting database 216 (discussed below) from new records added to transaction record queue 222.

FIG. 3 shows Ads database 214 and Ads Logging and Reporting database 216. Database 216 stores all the advertisements (or other types of messages) being used by the systems as well as all logging and other information. A subset of advertisements (or other type of messages) that are active will be stored in ads database 214, which is a production version and subset of the advertisements (or other type of messages) in database 216. Sync Daemon 215 periodically (e.g., hourly) synchronizes ads database 214 to the appropriate records of ads logging and reporting data base 216. Each advertisement (or other type of message) will have a time frame when it is active. When that advertisement/message is active, it will be synchronized into ads database 214.

Hourly, Ads Manager 218 checks ads database 214 and picks a small percentage of active advertisements (or other type of messages) in ads database 214 that should be pushed to mobile computing devices in the next hour. Ads Manager 218 will categorize and prioritize those ads/messages based on targeting Ads parameters and other business rules and store the results as tables in ads database 214. Update Daemon 212 will pick up the new tables created by Ads Manager 218 periodically, or by trigger from Ads Manager 218, and store the tables in Prioritized Targeted Ads/Messages data store 208 and General Ads/Msgs 224 (hereinafter referred to as the "Cache").

Ads Manager 218 categorizes the ads in the tables into three major categories: high priority announcements, general advertisements (with no targeting parameters) and regular targeted advertisements. Regular targeted advertisements are categorized and separated based on ad criteria, and sorted by priority within a category based on business rules. Ads Manager 218 creates new tables with only advertisements (or other messages) that need to go out in the next hour. Once the new tables are created, Ads Engine 204 is notified and the old memory tables stored in prioritized targeted ads/messages 208 (the Cache) are deleted. This process repeats every hour, or at another period. Emergency messages or announcements may be pushed into the high priority category at any time, and do not need to wait for the full one hour cycle.

Note that application interface 202, Ads Engine 204, Agent 206, data store 208, Update Daemon 212, Ads Database 214, database 216, Logging Daemon 220, Transactional Record Queue 222 and general ads/messages data store 224 are also implemented in the ad/msg servers 30.

In one embodiment, database 214 can be optimized for a quick selection but will not have logging information and ads that are not currently active. FIG. 4 shows the data stored in a record for Ads database 214. As can be seen, each record stored includes an identification of the advertisement (Ad_id), an identification of the customer Campaign (Campaign_id), the Price per impression (Price), the Bid Price used as part of the priority calculation (Bid_Price), the starting point for priority calculation from the Main database (Def_Priority), the message type being text or binary voice file (Msg_Type), the text of the advertisement (Msg_text), the voice file if message type is binary (Msg_Bin), GPS coordinates associated with the advertisement (Loc_X and Loc_Y), the maximum distance in miles to the GPS coordinates (Loc_R), the city associated with the location (Loc_City_Code), the state (Loc_State_Code), country (Loc_Country_Code), minimum or maximum distance of the person receiving the advertisement should be from the reference GPS coordinates in miles (Travel_Dist), time for pushing the advertisement (Time_Period), and age group demographic data (Age_Group), gender (Gender), marital status of the target demographic (Marital_Status), educational level (Ed_Level), educational group type (Ed_Type), indication of a category of applications (App_Group) that the advertisement should be provided to, indication of a particular set of popular applications (App_List) that the advertisement should be provided to, indication of target devices (Device_Group), job type (Job_Group), household income information (HHI_Group), ethnicity (Ethnicity), Religion (Religion) and interest or hobby (Interest). Other information needed for calculating number of Ads/Messages to be delivered and its priority is in other tables which are stored at the campaign level (a group of Ads with a single budget). This includes the total campaign budget, the total advertisements delivered as of the last update, when to start pushing the advertisement, when to stop pushing the advertisement, and ad priority based on business rules.

FIG. 5 shows the data in one record in the Cache. The data in the record of FIG. 5 is the same as the data in record of FIG. 4, except that the record of FIG. 5 uses one price (either the Price or the Bid_Price from the database and sets the new field (Bid_Flg) to indicate which one the Ads Manager has decided to use. In addition, it has the calculated category of each Ad (Cat) and a set of n Equivalent Ads to be used as alternatives to the current Ad (Equiv_Ad1, Equiv_Ad2, . . . Equiv_Adn).

Figure 6:
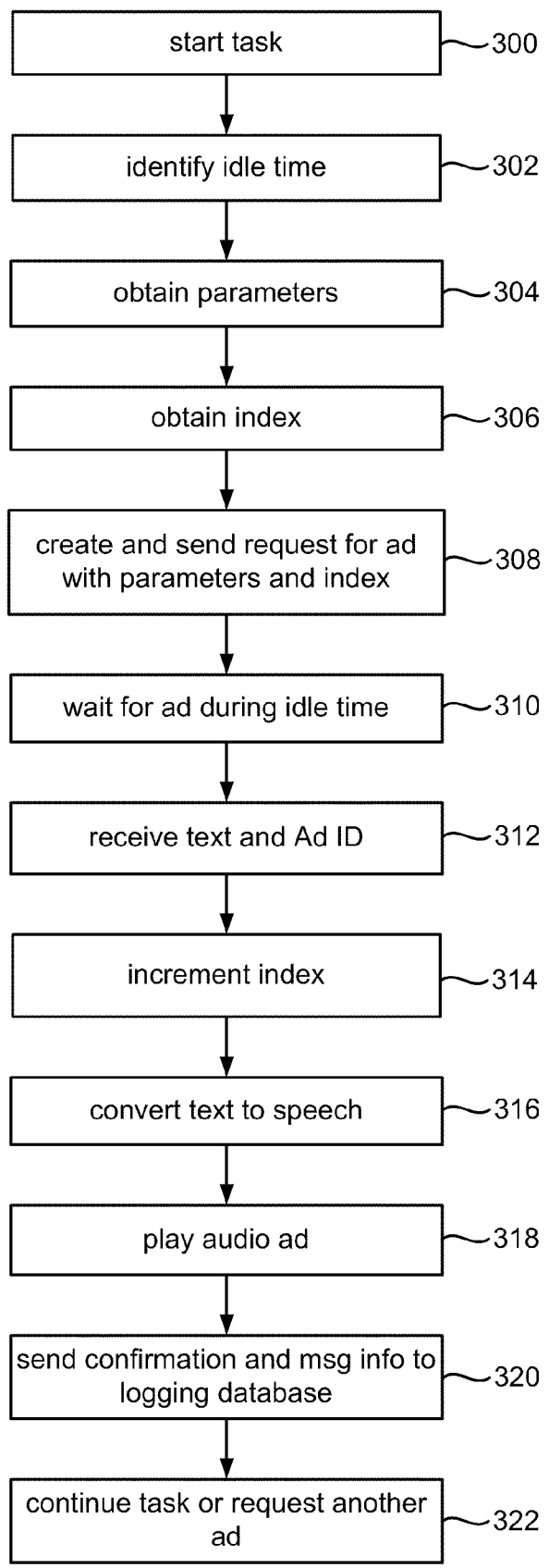
FIG. 6 is a flow chart describing one embodiment of a process for requesting and playing an audio message during idle time.

FIG. 6 is a flow chart describing one embodiment of a process performed by client application 200, that includes requesting advertisements (or other types of messages) and playing the returned message(s) upon receipt. In one embodiment, client application 200 will request advertisements (or other types of messages) in order to fill idle time while the client application 200 is loading data, loading another application, processing information, or otherwise waiting. In step 300, client application 200 will start a task, such as downloading an application or data, calculating information, communicating with another entity, etc. That task will include some idle time. For purposes of this document, idle time is defined as a period of time when the mobile computing device appears to not be active from the user point of view. For example, when the mobile device is downloading data or an application from a remote server, the mobile computing device appears idle to the user. The user is not performing any function and not interacting with a device at that time. This idle time is also referred to as "dead" time from the user's point of view. In step 302, client application 200 will identify that the user is currently experiencing idle time. For example, client 200 can be programmed so that when it performs a certain set of functions (e.g. downloading data, downloading applications, communicating with a remote entity, performing lengthy calculations, etc.) client application 200 will identify that there is idle time.

In response to determining that it has idle time, client application 200 will obtain parameters associated with that client application (step 304), obtain an index (step 306) and create a request for an advertisement (or other type of message) in step 308. The request for advertisement is transmitted as part of step 308, and includes the parameters obtained from step 304 and the index from step 306. The parameters are one or more sets of data associated with the current state and physical properties of the mobile computing device as well as the user of the mobile computing device. Examples of parameters include location, date, time, city, state, country, age of the user, gender of the user, marital status of the user, income level of the user, educational level of the user, the identification of the application, the identification of the hardware, the mobile computing device, the job of the user, the ethnicity of the user, the religion or the user, the current context or the current screen and any hobbies (interests) that the user has. These parameters match the various criteria shown in FIG. 4 and FIG. 5 that are stored in the records for each of the advertisements. Additionally, the mobile computing device will keep an index of how many advertisements (or other type of messages) it has requested during this particular session. A session correlates to the time since the client application was started, and/or a specific period of time. This index is used to help prevent or minimize the same advertisement (or other type of message) from being repeatedly sent to the same user at the same mobile computing device.

After sending the request for the advertisement (or other type of message) in step 308, the system will wait to receive the advertisement (or other type of message) in step 310. This waiting is also during the idle time discussed above. In one embodiment, the wait will be less than one second. However, in other embodiments, the wait can be more than one second. In step 312, client application 200 receives and stores the advertisement (or other type of message) and an (optionally) an ID for the advertisement (or other type of message) The ID is just a unique identifier for the particular advertisement (or other message) used in the event the user requests additional information about the Ad and to navigate backwards or forwards between all the Ads the user has received in the current session.

In some embodiments, the advertisement (or other type of message) is received as an audio file (e.g. .mp3, .wma, or other sound format). In other embodiments, the advertisement (or other type of message) is received as text (e.g. ASCII text) and initially stored as text. In step 314, the index is incremented. In step 316, the text for the advertisement (or other type of message) is converted to speech. Step 316 includes converting text format to an audio format. There are many systems known in the art for converting text to speech. In step 318, the audio format data is played. For example, the advertisement which was converted from text to speech is played via a speaker in the mobile computing device, on a speaker, headphone or ear phones. Some embodiments include an optional step 320, in which the Mobile device application sends confirmation of "Message Delivered" to the "Logging and Reporting database." In step 322, client application 200 continues its task or requests another advertisement (or other type of message). Thus, in one embodiment, it is contemplated that steps 304-322 are all performed while mobile computing device is still idle.

Figure 7:
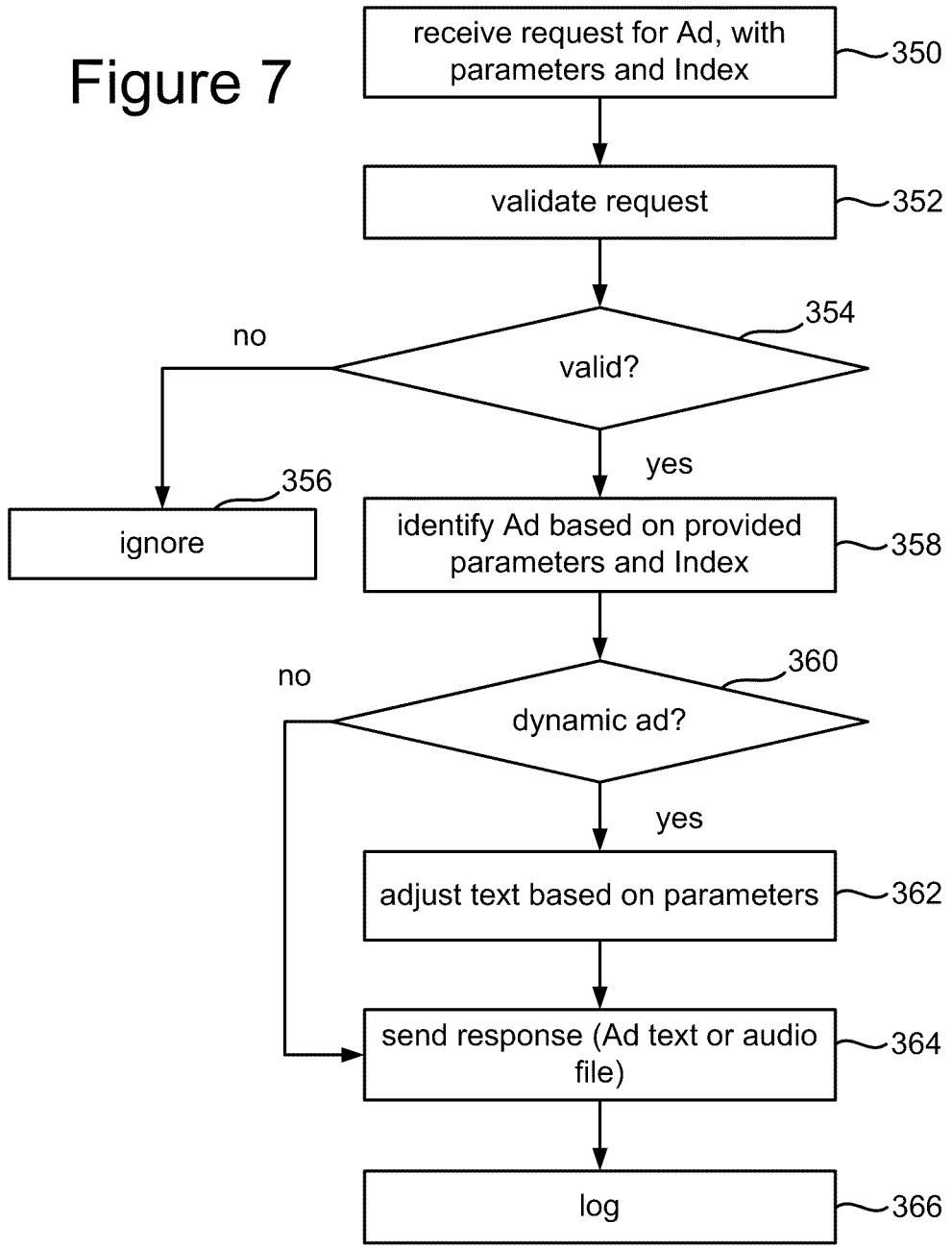
FIG. 7 is a flow chart describing one embodiment of a process for providing audio messages to mobile devices.

FIG. 7 is a flow chart describing one embodiment of a process performed by the one or more ads/msg servers 30 in response to receiving a request (see step 308 of FIG. 6) from client application 200 for an advertisement (or other type of message). In step 350, a request is received for an advertisement (or other type of message). That request will include the parameters (discussed above) associated with the mobile computing device that is the source of the request. The request will also include the index. In one embodiment, the request is received at application interface 202, which will forward the request to Ads Engine 204. At step 352, Ads Engine 204 will validate the request. For example, the request may also include an identification for application 200, an identification for the mobile computing device and/or identification code created using a secret formula combining the current time at the computing device with a public and private keys. The system will determine whether the client application or mobile computing device is authorized to request advertisements. If not, the request is not valid (step 354) and the request will be ignored (step 356). If the request is valid (step 354) then in step 358, Ads Engine 204 will use Agent 206 to identify an appropriate advertisement (or other type of message) based on the provided parameters and the index. In step 360, it is determined whether the identified advertisement (or other type of message) is a dynamic advertisement (or other type of message). If not, then the process skips to step 364 and sends the response to client application 200. That response will include the text or audio file for the advertisement (or other type of message) and (optionally) the ID for the advertisement (or other type of message). In step 366, the system logs the identification of the advertisement (or other type of message) that is being sent back to the mobile computing device.

If it is determined that the advertisement (or other type of message) is a dynamic advertisement (or other type of message), then in step 362 the text of advertisement (or other type of message) is adjusted based on the parameters received in the request. The process will then continue in step 364. A dynamic advertisement (or other type of message) is one in which it is edited on the fly based on the parameters. For example, a dynamic advertisement may say "I smell coffee at Starbucks half a mile from you." The portion of the ad that says "half a mile from you" is added dynamically. Another example is an advertisement that announces "Don't miss the sale at store X tomorrow." The portion of the advertisement that indicates "tomorrow" is created dynamically based on the parameters received in the request. More details of how to adjust the advertisement (or other type of message) is provided below.

Figure 8:
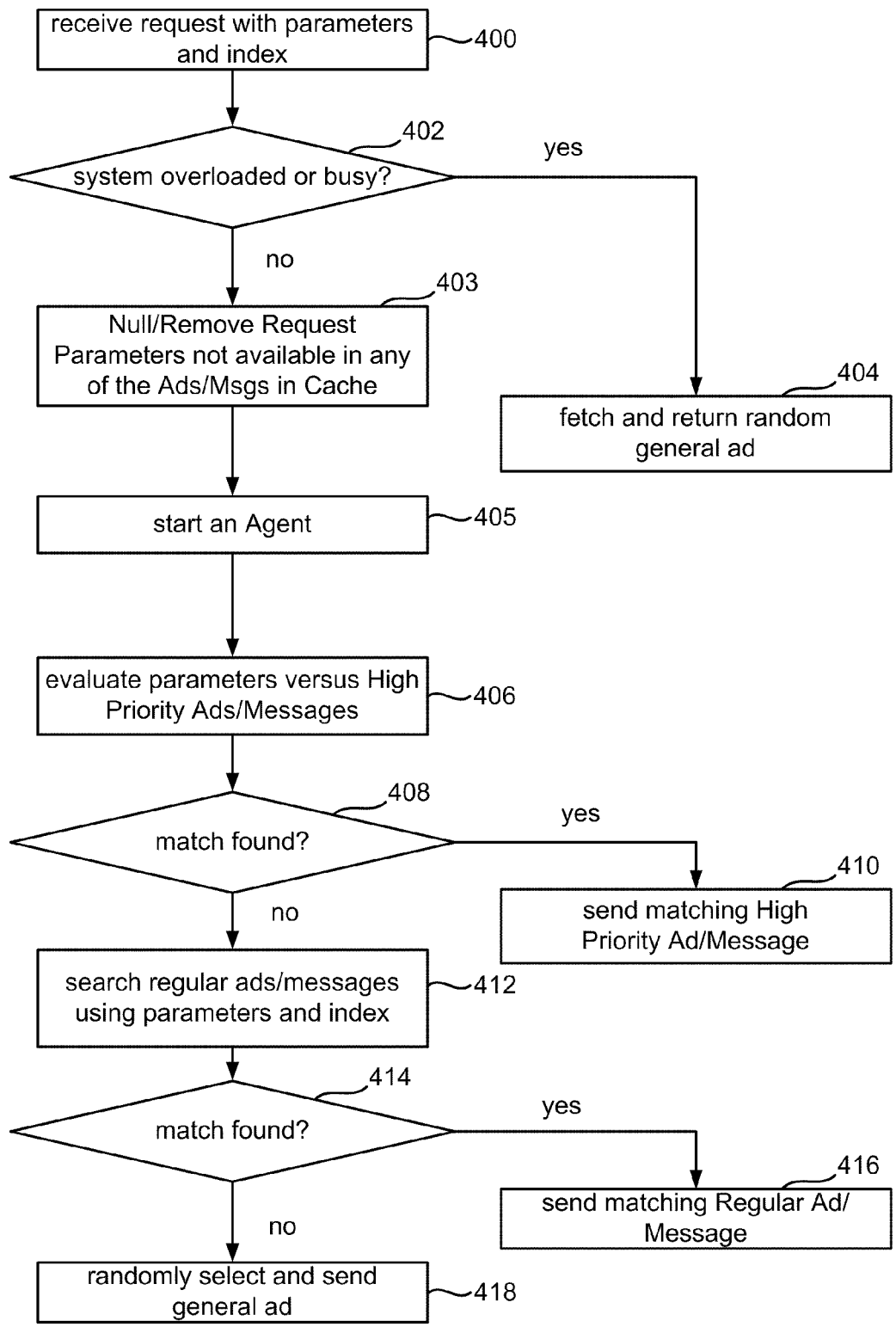
FIG. 8 is a flow chart describing one embodiment of a process for selecting an audio message.

FIG. 8 is a flow chart describing one embodiment of a process for identifying the appropriate advertisement (or other type of message) based on the parameters and the index. The process of FIG. 8 is one example implementation of step 358 of FIG. 7. In step 400 of FIG. 8, Ads Engine 204 will receive the request with the parameters and the index. In step 402, Ads Engine 204 will determine whether the system of FIG. 3 (e.g. the ad/msg server 30) is overloaded or too busy to search for the appropriate advertisement (or other type of message) which should only happen in exceptional peak times or abnormally high load. The metrics for determining whether the server(s) is/are too busy is based on the individual implementation. If the system is overloaded or too busy, then in step 404 Ads Engine 204 will retrieve a general advertisement/message from general ad/message data store 224 and return that general advertisement (or other type of message) for delivery to client application 200.

If the system is not overloaded or too busy (step 402), then in step 403 Ads Engine 204 will remove/null the unsupported parameters based on all the available Ads in Cache. That is if there are parameters in the request and there are no ads/messages in the cache that use those parameters, then the unused (unsupported) parameters are removed from the request to make the subsequent searching more efficient. In step 405, Ads Engine 204 starts a new Agent 206 or use an existing Agent 206. In step 406, Agent 204 will compare the parameters to high priority advertisements (or other type of message). In one embodiment, high priority advertisements (or other type of message) are stored in database 208 as records in tables, such as the records of FIG. 5. Thus, in step 406, Agent 206 will compare the parameter values from the request to the criteria/parameter values stored in the individual records for the advertisement (or other type of message). If a match is found (step 408), then the high priority message is returned for delivery to client application 200 in step 410. If a high priority message is not found, then in step 412, Agent 206 will search the regular advertisements (or other type of message) using the parameter values and the index to identify a regular advertisement (or other type of message). If a match is found (step 414), then the regular advertisements (or other type of message) identified will be returned for delivery to client application 200 in step 416. If no match is found in step 414, then Agent 206 will randomly choose a general ad/message from data store 224 (step 418).

Figure 9:
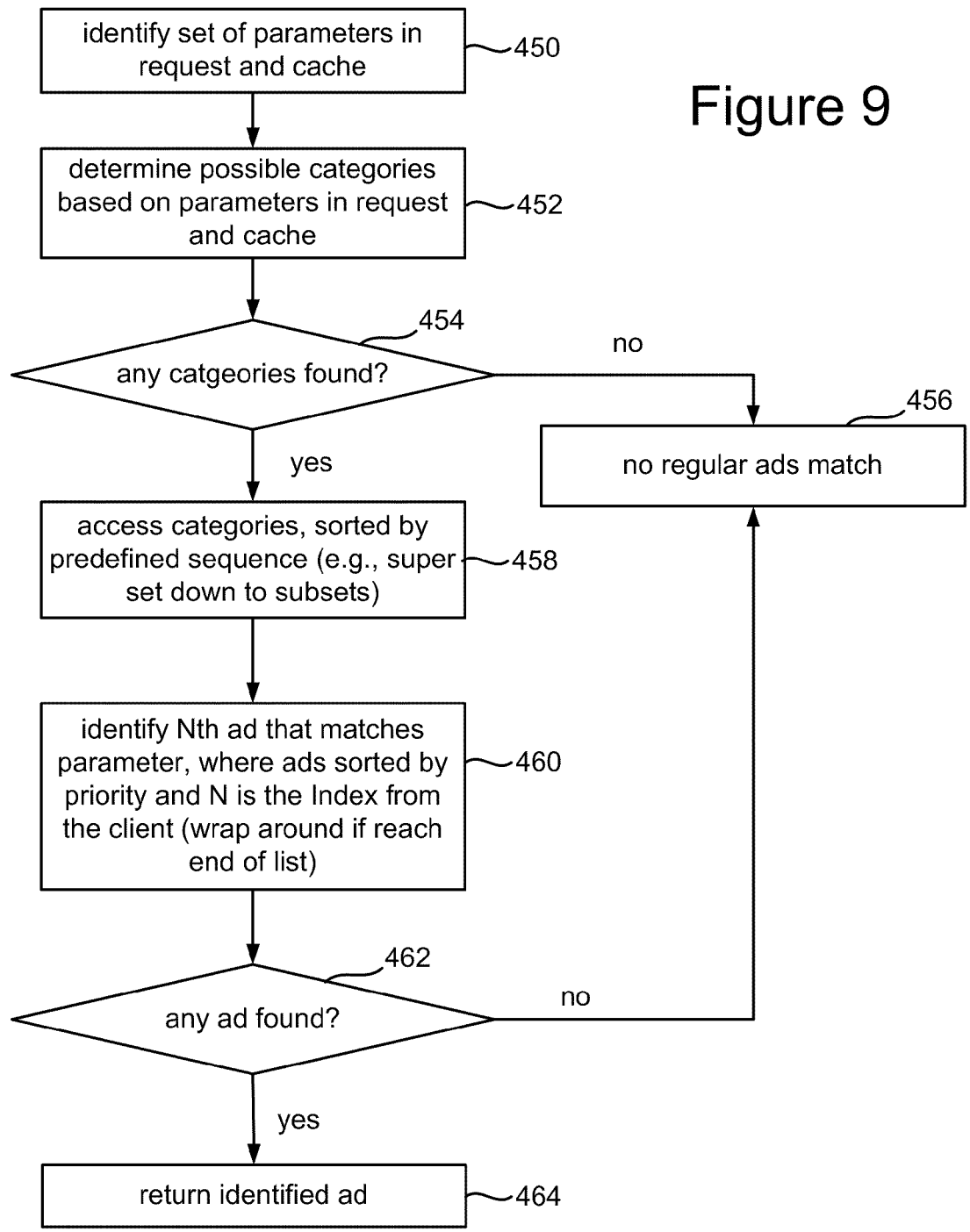
FIG. 9 is a flow chart describing one embodiment of a process for identifying an appropriate audio message to be returned based on matching criteria from the request (sent parameters) to criteria of the available audio messages.

FIG. 9 is a flow chart describing one embodiment of a process for searching regular advertisements (or other type of messages) using the parameters and index in order to identify an advertisement (or other type of message) that matches the parameter values received in the request from client application 200. The process of FIG. 9 is one example implementation of step 412 of FIG. 8. Additionally, the process of FIG. 9 can also be used to implement step 406 of FIG. 8. However, when used to implement step 406, the process of FIG. 9 will search only high priority advertisements/messages and when performing step 412 the process of FIG. 9 will only search regular advertisements/messages.

In step 450 of FIG. 9, Agent 206 will identify the set of parameters that are in the request received from client application and are in the cache (database 208). The cache includes records for the regular advertisements (or other type of messages) in the format of FIG. 5, or other formats. At the end of step 450, Agent 208 has a list of parameters that appears in the request received from client application 200 and also appear in the cache. By "appear in the cache" it is meant that there exists data populated in the fields for the parameter. If there is a parameter in the request for which there is no corresponding data the cache, then that parameter will ignored and will not be part of the output of step 450.

In step 452, Agent 206 will determine all categories that are possible based on the parameters in the request and in the cache. In one embodiment, the system will create a category for every (or a subset of every) permutation or combination of parameters. In one example implementation, the system will have a data structure which lists all the categories. Each record will indicate an integer identifying the category and all the parameters represented in that category as well as the data values for those parameters. For example, one category can be for women between the ages of 25 and 45 and, therefore, will include the parameters Gender and Age_Grp. Different implementations can utilize different sets of categories. Step 452 determines all the possible categories that can be associated with the parameters that are in both the request and in the cache. If there are no such categories found (step 454), then no regular ads will match the parameters from the request (see step 456) and the system will return a general ad.

If at least one category is found (step 454), then Agent 206 will search the advertisements in the possible set of categories, sorted by category, in step 458 in the proposed sequence (Category n, then Category m, etc.). In one embodiment, the advertisements and categories are sorted such that categories that are supersets are listed first and subsets are listed subsequently. For example, if a first category includes parameters A, B, C, and D and a second category includes parameters A, B, C, then the first category will be listed first because it is a superset of the second category. Alternatively, the categories can be prioritized based on importance to the entity providing the advertisements. Other schemes for sorting the categories can also be used.

In step 460, Agent will look for the first advertisement (or other type of message) in the sorted list of advertisements (or other type of message), that are sorted by category (with categories sorted by priority as discussed above). If the index received in the request is 1, then that first advertisement/message found (step 462) will be returned as the identified advertisement/message (step 464). If the ad index is 2, then the system will identify the second advertisement/message in the sorted list that matches the parameters (for speed, a match list for each Ad is pre-identified and stored in Cache when the Ads Manager creates the Cache). If the index is N, then the system will identify the Nth advertisement/message that matches the parameters. The advertisement/message that matches the parameters and that is the Nth advertisement/message will be returned in step 464. If no advertisement/message is found (step 462), then there are no regular advertisement/message that match (step 456).

As explained above with respect to steps 360 and 362 of FIG. 7, some ads will include dynamic text. There are many formats for adding dynamic text to a message. One embodiment includes using the following dynamic indicators in the text of an advertisement/message to represent where dynamic text needs to be added %% time=<time value> %%
%% location=<GPS coordinates> %%
%% date=<date value> %%

In the above examples, the double percent sign (%%) is used to indicate the start and end of dynamic text. Right after the first double percent sign (%%) is a dynamic variable (e.g., time, location, date, or other) and following the equal sign is an optional reference value (e.g., <time value>, <GPS coordinates>, <date value>, or other) for the dynamic variable. The reference value can be used to calculate replacement text, as discussed below. For example, the dynamic indicator %% time=4:00 %% could be replaced by accessing the parameter received from the client application 200 indicating the current time of the request and replacing the dynamic text %% time=4:00 %% with the difference between the current time (parameter in the request—e.g., 1:00) and the time in the dynamic text (4:00) so that dynamic indicator %% time=4:00%% would be replaced with "3 hours." An example advertisement could be as follows: "A Valentine's Day Party starts at the Lounge in San Francisco is in %% time=22:00 %%." If the parameter received from client application 200 indicates it is currently 5:00 p.m. (17:00), then the dynamic advertisement will be changed to indicate the following: "A Valentine's Day Party at the Lounge in San Francisco is in 5 hours." The above are just one example format. Other formats could also be used. The technology described herein is not limited to any particular format.

Figure 10:
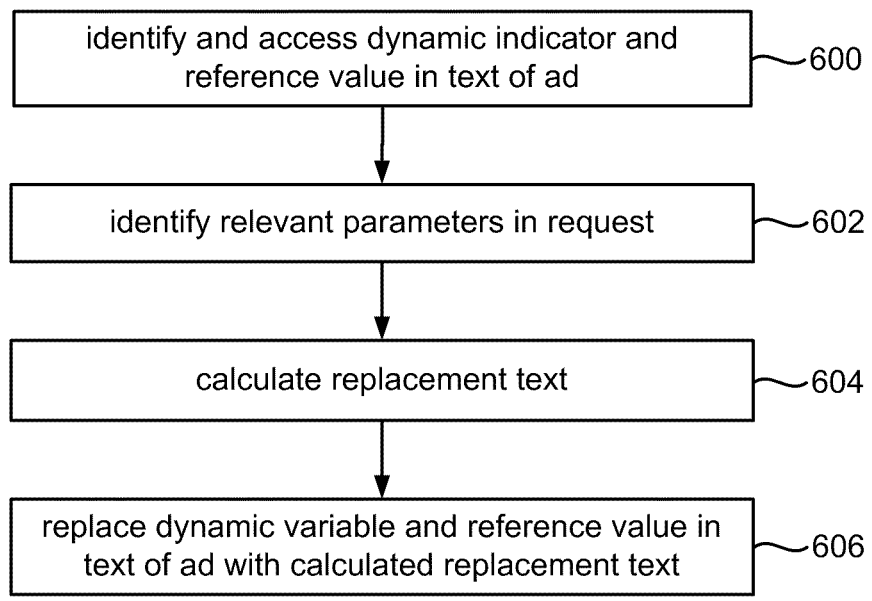
FIG. 10 is a flow chart describing one embodiment of a process for dynamically editing an audio message based on one or more of the parameters in a request for a message.

FIG. 10 is a flow chart describing one embodiment of a process for adjusting an advertisement (or other type of message) based on dynamic text in the advertisement (or other type of message). That is, the process of FIG. 10 is one example implementation of step 362 of FIG. 7. In one embodiment, the process of FIG. 10 is performed by Ads Engine 204 after receiving the ad text from Agent 206.

In step 600 of FIG. 10, Ads Engine 204 parses the text for advertisement (or other type of message) selected to be served to the mobile computing device and identifies the dynamic indicator (e.g., %% time=<time value> %%, %% location=<GPS coordinates> %%, %% date=<date value> %% or other). In general, the dynamic indicator is information that identifies that dynamic content needs to be added. Step 600 will also include identifying the reference value (e.g. the data associated with the dynamic indicator). For example, in the above example of %% time=22:00 %%, the reference value is 22:00. In some embodiments, an advertisement (or other type of message) can have multiple dynamic indicators, all of which will be replaced with new content as per the process of FIG. 10.

In step 602, Ads Engine 204 identifies the relevant parameters in the request received from client application 200. Thus, Ads Engine 204 identifies all of the parameters received in the request from client application 200 that will be used to calculate the replacement text for the dynamic indicator. In the above example of %% time=22:00 %%, the parameter identified in step 602 includes Time_Crit. If the dynamic variable is location, then the parameter could include Loc_Xrefpoint and/or include Loc_Yrefpoint. Many different dynamic indicators can be used.

In step 604, Ads Engine 204 calculates the replacement text. In the above example, Ads Engine 204 calculates that the current time differs from the time in the advertisement/message by 5 hours (22:00 p.m.–17:00 p.m.). The calculation could also be distance from the mobile computing device to the coordinates put in the advertisement/message, number of days until the particular event as indicated by the date in the advertisement/message, as well as other calculations depending on the particular variable that is being used. In step 606, the calculated replacement text is used to replace the dynamic indicator, as indicated above in the example with respect to the Valentine's Day Party at the Lounge. Any of the parameters discussed above with respect to FIG. 5 can be used to create a dynamic advertisement/message.

In the above examples, the client application 200 will request advertisements/messages from ad/msg server 30 on the fly (e.g., in real time when needed). In another embodiment, all the relevant ads/messages will be downloaded to the mobile computing devices 10, 12, 14 in advance so that client application 200 can request the data from another software entity or library (provided) on the same mobile computing device that performs the whole or part of the processes of FIGS. 7-10 and sends confirmation of Ad delivery to the Ads logging and Reporting database.

In another alternative, all the relevant ads/messages will be downloaded to the mobile computing devices 10, 12, 14 in advance and client application 200 which includes a special library (provided) will perform the processes of FIGS. 7-10 and sends confirmation of Ad delivery to the Ads logging and Reporting database.

In another embodiment, if a particular Agent does not respond with an ad to Ads Engine 204 within a particular of time (e.g. 50 ms), then Ads Engine 204 will randomly choose an ad from general ads/messages 224.

One embodiment includes identifying idle time for the mobile device and presenting an audio message during the idle time in response to identifying idle time.

One embodiment includes one or more processor readable storage devices having processor readable code stored thereon. The processor readable code programs one or more processors to perform a method comprising identifying idle time for the mobile device and presenting an audio message during the idle time in response to identifying idle time.

One embodiment includes an audio output interface, one or more processors in communication with the audio output interface, and one or more storage devices in communication with the one or more processors. The one or more storage devices store code that programs the one or more processors to identify idle time for the mobile device and present an audio message via the audio output interface during the idle time in response to identifying idle time.

One embodiment includes identifying idle time for the mobile device, accessing one or more parameters associated with the mobile device in response to the identifying idle time, identifying a message in response to the one or more parameters, transmitting the message to the mobile device in response identifying the message, and playing the message at the mobile device.

One embodiment includes receiving a request for a message (the request includes one or more parameters associated with the mobile device), identifying a message in response to the one or more parameters, dynamically editing the message based on one or more of the parameters, and transmitting the dynamically edited message to the mobile device.

One embodiment includes a communication interface, one or more processors in communication with the communication interface, and one or more storage devices in communication with the one or more processors. The one or more processors receive a request for a message via the communication interface. The request includes one or more parameters associated with the mobile device. The one or more storage devices store code that programs the one or more processors to identify a message in response to the one or more parameters, dynamically edit the message based on one or more of the parameters and transmit the dynamically edited message to the mobile device.

One embodiment includes a mobile device identifying (while performing a function) that it is idle while it is downloading content or performing another task. During that idle time, it gathers one or more parameters (e.g., location, time, gender of user, age of user, etc.) and sends a request for an audio message (e.g., audio advertisement). One or more servers at a remote facility receive the request with the one or more parameters, and use the parameters to identify a targeted message. In some cases, the targeted message will include one or more dynamic variables (e.g., distance to store, time to an event, etc.) that will be replaced based on the parameters received from the mobile device. The targeted message is transmitted to the mobile device as text. After being received at the mobile device, the text is converted to an audio format and played over a headphone, loud speaker, ear bud, etc.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method of providing messages on a mobile device, comprising:
   identifying idle time for the mobile device; and
   presenting an audio message during the idle time in response to identifying idle time, wherein the presenting the audio message during the idle time comprises:
      gathering one or more parameters associated with the mobile device,
      accessing an index,
      sending a request in response to identifying idle time, the request includes the one or more parameters and the index,
      receiving a response message in response to the request, the response message is received in response to the one or more parameters and the index, and
      incrementing the index.

2. The method of claim 1, wherein:
   performing a task, the identifying idle time includes identifying that the mobile device is idle while performing the task.

3. The method of claim 2, wherein:
   performing a task includes loading an application, loading data, waiting for a response to a request, or processing data.

4. The method of claim 1, wherein:
   the method further includes performing a task, the identifying idle time includes identifying that the mobile device is idle while performing the task;
   the response message includes text;
   the audio message is in a sound format;
   the presenting the audio message during the idle time further comprises creating the audio message by converting the text to the sound format;
   the performing the task is started prior to the identifying idle time; and the performing the task is completed after the presenting the audio message.

5. The method of claim 1, wherein:
the audio message is in a sound format; and
the presenting the audio message during the idle time comprises receiving text in response to identifying idle time, creating the audio message by converting the text to the sound format, and playing the audio message after the converting.

6. The method of claim 1, wherein:
the audio message is an advertisement;
the mobile device includes a wireless telephone; and
the identifying idle time and presenting the audio message is performed an application on the mobile device.

7. One or more processor readable storage devices having processor readable code stored thereon, the processor readable code for programming one or more processors to perform a method comprising:
   identifying idle time for the mobile device;
   performing a task, the identifying idle time includes identifying that the mobile device is idle while performing the task; and
   presenting an audio message during the idle time in response to identifying idle time, wherein the presenting the audio message during the idle time comprises:
      gathering one or more parameters associated with the mobile device,
      sending a request in response to identifying idle time, the request includes the one or more parameters,
      receiving a response message in response to the request, the response message is targeted based on the one or more parameters, the response message includes text, the audio message is in a sound format, and
      creating the audio message by converting the text to the sound format and playing the audio message in the sound format, the performing the task is started prior to the identifying idle time and the performing the task is completed after the presenting the audio message.

8. A method of providing messages on a mobile device, comprising:
   identifying idle time for the mobile device;
   accessing one or more parameters associated with the mobile device in response to the identifying idle time;
   identifying a message in response to the one or more parameters;
   dynamically editing the message based on one or more of the parameters prior to playing the message, wherein the dynamically editing the message comprises:
      identifying a dynamic indicator in the message,
      identifying a relevant parameter of the one or more parameters,
      calculating replacement content based on the relevant parameter, and
      replacing the dynamic indicator with the replacement content; and
   playing the message at the mobile device.

9. The method of claim 8, wherein:
the message is stored as text; and
the playing the message at the mobile device includes converting the text to a sound format and playing the message from the sound format.

* * * * *